(12) United States Patent
Wojack et al.

(10) Patent No.: US 8,462,517 B2
(45) Date of Patent: Jun. 11, 2013

(54) REWORKABLE MOBILE ELECTRONIC DEVICE

(75) Inventors: Jason P. Wojack, Libertyville, IL (US); Joseph L. Allore, Mundelein, IL (US)

(73) Assignee: Motorola Mobility LLC, Libertyville, IL (US)

( * ) Notice: Subject to any disclaimer, the term of this patent is extended or adjusted under 35 U.S.C. 154(b) by 293 days.

(21) Appl. No.: 12/975,651

(22) Filed: Dec. 22, 2010

(65) Prior Publication Data

US 2012/0162953 A1 Jun. 28, 2012

(51) Int. Cl.
*H05K 7/14* (2006.01)
*H05K 7/18* (2006.01)

(52) U.S. Cl.
USPC ............................ 361/802; 361/728; 361/801

(58) Field of Classification Search
USPC ................ 361/752, 796, 728–730, 800–803; 455/575.1–575.3, 575.24
See application file for complete search history.

(56) References Cited

U.S. PATENT DOCUMENTS

| | | | | |
|---|---|---|---|---|
| 5,845,803 | A * | 12/1998 | Saito et al. | 220/378 |
| 7,210,963 | B2 * | 5/2007 | Chintala et al. | 439/594 |
| 7,688,574 | B2 * | 3/2010 | Zadesky et al. | 361/679.21 |
| 7,764,936 | B2 | 7/2010 | Nakasono et al. | |
| 7,933,123 | B2 * | 4/2011 | Wang et al. | 361/679.56 |
| 8,218,306 | B2 * | 7/2012 | Lynch et al. | 361/679.3 |
| 8,250,724 | B2 * | 8/2012 | Dabov et al. | 29/428 |

* cited by examiner

*Primary Examiner* — Hung S Bui
(74) *Attorney, Agent, or Firm* — Gary J. Cunningham (57) ABSTRACT

An improved a mobile electronic device (10) is disclosed. The mobile electronic device (10) includes: a housing (12) including a display assembly (14) and a cover assembly (16), the display assembly (14) being complementarily configured to be partially received in the cover assembly (16), to define an enclosure (18) for electrical components; a gasket (20) located between the display assembly (14) and the cover assembly (16); and a sacrificial retention structure (22) including a plurality of connectors (24) configured to interconnect the cover assembly (16) with the display assembly (14). Advantageously, this structure allows: disassembly and reassembly of the housing (12), in the event of rework, enhanced water and dust resistance and a simple and secure snap-connected housing (12).

18 Claims, 9 Drawing Sheets

REWORKABLE MOBILE ELECTRONIC DEVICE

BACKGROUND OF THE INVENTION

1. Field of the Disclosure

The disclosure relates in general to electronic devices, and more particularly, to a repairable mobile electronic device.

2. Background Art

There is a significant market for mobile electronic devices with large displays and thin profiles. Many have tried to provide housings for such devices, but are forced to use adhesives in ultra thin environments. A mobile electronic device with small but strong connectors would be considered an improvement in the art, as factory and field workers could repair and rework them, as needed, rather than scraping such devices.

Further, when using resilient materials in housings for mobile electronic devices, connectors can become damaged upon assembly. Thus, robust connectors that can withstand assembly and tough user environments, would be considered an improvement in the art.

Further, there is a need for mobile electronic devices which are repairable at the factory or in the field, and have enhanced water and dust resistance.

It is therefore desirable to provide an improved mobile electronic device which overcomes most, if not all, of the preceding problems.

DETAILED DESCRIPTION OF THE INVENTION

The following is a detailed description and explanation of the preferred embodiments of the invention and best modes for practicing the invention.

Referring to the drawings, a mobile electronic device 10 is shown. The mobile electronic device 10 in FIG. 1 can include: a housing 12 including a display assembly 14 and a cover assembly 16, the display assembly 14 being complementarily configured to be partially received in the cover assembly 16, to define an enclosure 18 for electrical components; a gasket 20 located between the display assembly 14 and the cover assembly 16; and a sacrificial retention structure 22 including a plurality of connectors 24 configured to interconnect the cover assembly 16 with the display assembly 14. Advantageously, the device 10 structure allows disassembly and reassembly of the housing 12, in the event rework and/or repair is necessary. In addition, the housing can provide enhanced water and dust resistance. Advantageously, the plurality of connectors 24 can provide a secure and water resistant interconnection, forming a resilient housing 12. Further, the plurality of connectors 24 take up a minimal amount of room in the enclosure 18, for maximizing the area available for electronic component placement and layout therein. In one embodiment, the connectors 24 can be securely connected by pushing down the display assembly 14 to the cover assembly 16, along a negative z-axis, shown in compass 26 in FIG. 1, for a simple snap-fit assembly. Further, the device 10 can provide a very thin or ultra thin profile, if desired.

Figure 1:
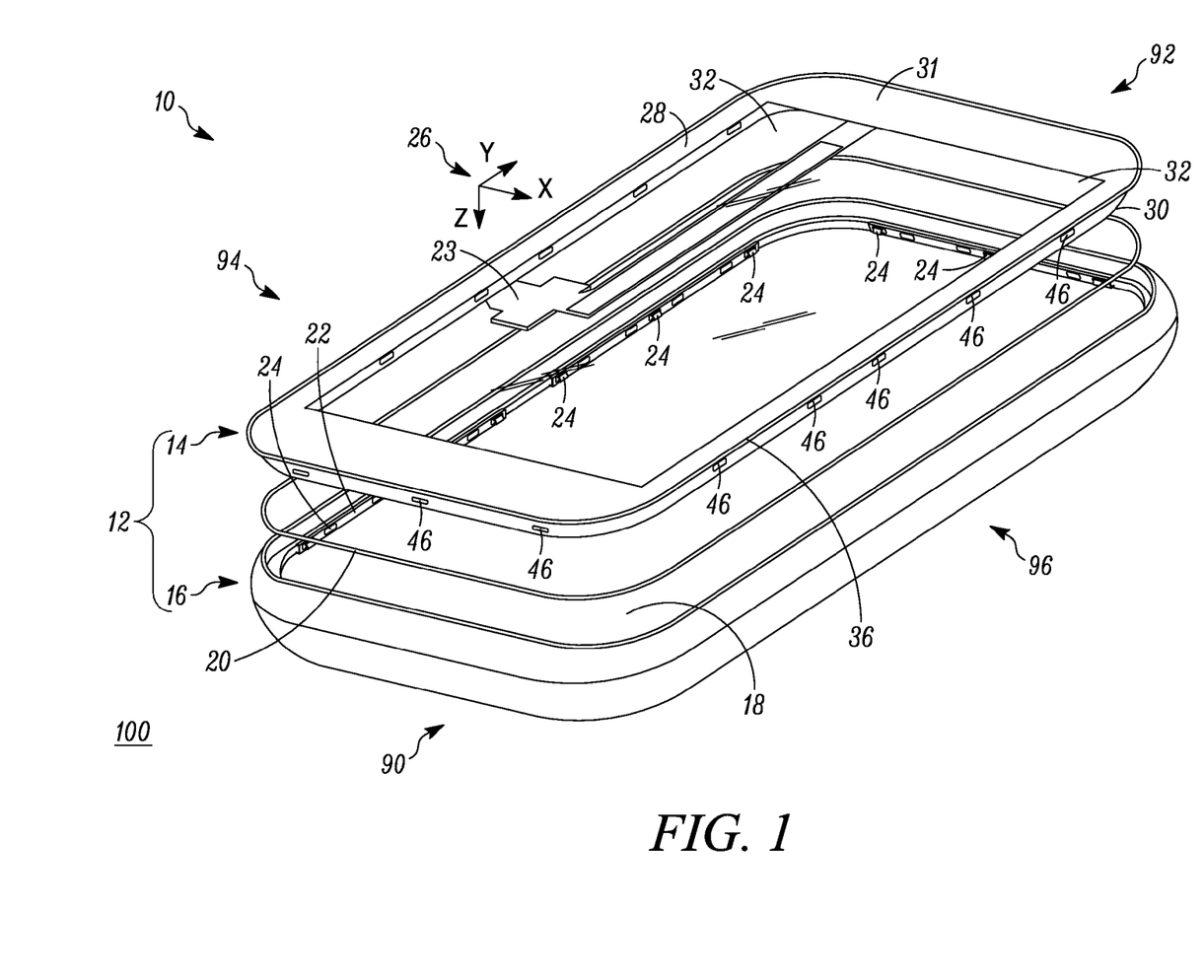
FIG. 1 is an isometric view of a mobile electronic device, showing a display assembly 14 and a cover assembly 16, a sacrificial retention structure 22 and a plurality of connectors 24 configured to interconnect the cover assembly 16 with the display assembly 14, in accordance with principles of the present invention.

As should be understood, the number and placement of the connectors 24 in FIG. 1, can vary widely, so long as a robust connection is provided.

Figure 2:
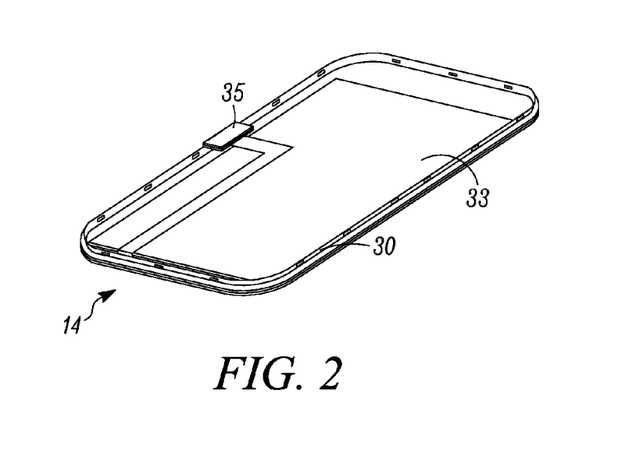
FIG. 2 is an enlarged partial perspective view of an embodiment of the mobile electronic device in FIG. 1, showing the display assembly 14 facing downwardly with a lens frame 30, back of lens surface 33 and connector 35, for connecting a touch screen display to a printed circuit, in accordance with principles of the present invention.
Figure 3:
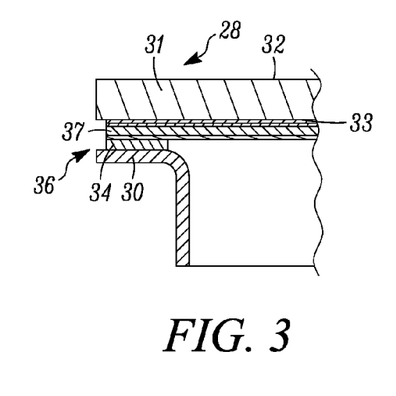
FIG. 3 is an enlarged partial cut away view of an embodiment of the mobile electronic device in FIGS. 1 and 2, showing a portion of the display assembly 14 including the display 28 and lens frame 30, adhesively laminated 34 to each other, around a periphery portion 36 thereof, providing a robust structure, in accordance with principles of the present invention.
Figure 4:
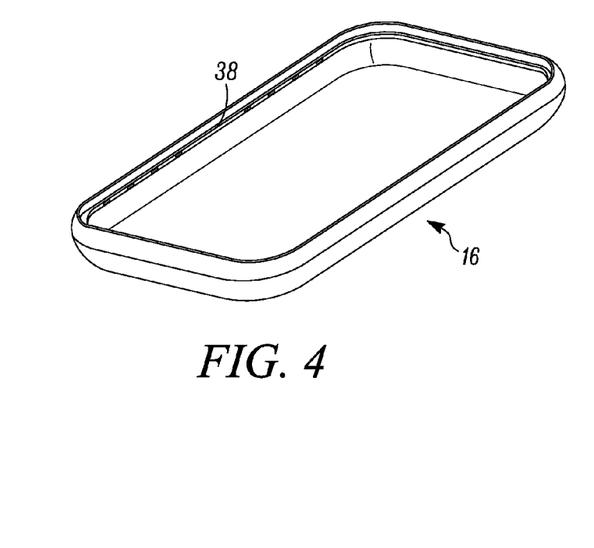
FIG. 4 is a perspective view of an embodiment of the mobile electronic device in FIG. 1, showing the cover assembly 16 including an inwardly facing ledge 38 configured to receive a gasket (not shown), the ledge 38 is generally L-shaped (rotated ninety degrees) including a proximal portion 40 and distal portion 42 (shown not connected to the display assembly 16), in accordance with principles of the present invention.

In a preferred arrangement, the display assembly 14 shown in FIGS. 1 and 2, includes a display 28, preferably a touch-screen display, for portable and efficient operation by a user, for example. The display assembly 14 also includes a lens frame 30, lens 31 and an input lens surface 32. As shown in FIG. 3, touch sensors 27 can be integrated to either the input surface 32 or the opposite or back of lens surface 33 of the lens 31 (FIG. 3). The touch sensors 27 generate a signal in response to a manually engageable haptic input from a user when the user touches the input lens surface 32 with a finger to emit light forming an image on the lens. A connector 35, for connecting a touch screen display to a printed circuit is shown in FIG. 2. In one embodiment, the display 28 is a touchscreen which can be transparent, clear and light transmissive and can comprise a capacitive touchscreen, an organic light emitting display (OLED) or a liquid crystal display (LCD), for example.

The mobile electronic device 10 can include at least one of: a flip phone, slider phone, portable networking device, internet communications device, clamshell device, tablet device, radio telephone, cellular phone, mobile phone, smart phone, portable gaming device, personal digital assistant, wireless e-mail device, two-way pager, mobile computing device and handheld electronic device. In one arrangement, the mobile electronic device 10 is of a compact size, such as with a narrow profile (or ultra thin profile). Advantageously, the connectors 24 help to provide a secure, disassembleable and durable housing 12 in connection with any of the above uses and similar uses, as should be understood by those skilled in the art.

In one embodiment, the display assembly 14 includes the display 28 and lens frame 30, adhesively laminated 34 to each other, around a periphery portion 36, providing a robust structure. The display assembly 14 is preferably constructed to fit at least partially in and/or on the cover assembly 16, for providing an attractive and robust structure, with an enclosure 18 for housing electronic components. display assembly includes a connector configured to connect a touch screen display to a printed circuit board in the housing.

As shown in FIG. 1, a connector interface 23 includes a multi-conductor connector for connecting a touch screen display to a printed circuit board with flex in the housing 12 enclosure 18. This structure helps to enable a narrow profile housing 12 and enhanced portability for device 10, in connection with many use cases such as a wireless communication device like a cell, portable phone, MP3 player and the like.

Figure 5:
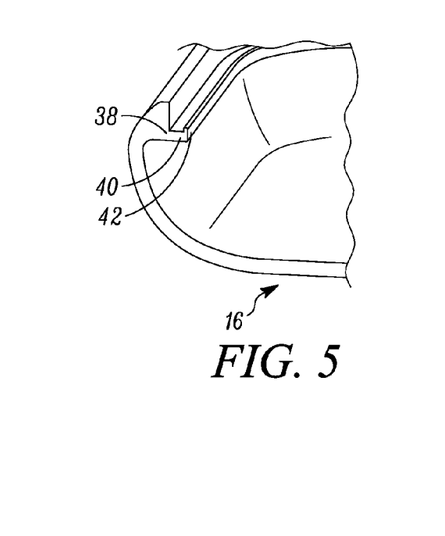
FIG. 5 is a partial perspective view of an embodiment of the mobile electronic device in FIG. 4, showing the cover assembly 16 including an inwardly facing ledge 38 configured to receive a gasket (not shown), the ledge 38 is generally L-shaped (rotated ninety degrees) including a proximal portion 40 and distal portion 42 (shown not connected to the display assembly 16). The ledge 38 extends around a periphery 36 of the cover assembly 16, in accordance with principles of the present invention.

In more detail, as best shown in FIG. 5, the cover assembly 16 includes an inwardly facing ledge 38 configured to receive the gasket 20. In a preferred embodiment, the ledge 38 is generally L-shaped (rotated ninety degrees) including a proximal portion 40 and distal portion 42. This construction provides a channel for receiving the gasket 20, for enhanced water and dust resistance, around the periphery 36 of the cover assembly 16.

Figure 6:
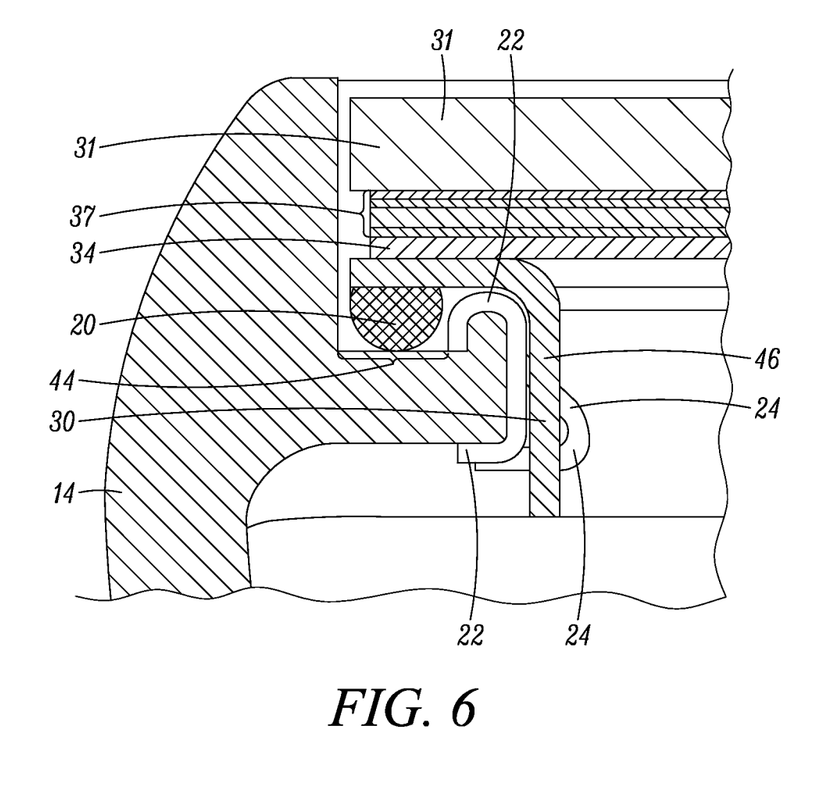
FIG. 6 is an enlarged partial cut away view of an assembled mobile electronic device 10 shown in FIGS. 1-5, showing the cover assembly 16 including an inwardly facing ledge 38 configured to receive a gasket 20 (shown compressed when assembled), the ledge 38 is generally L-shaped (rotated ninety degrees) and extends around a periphery 36 of the cover assembly 16, forming a channel 44. Also partially shown is a sacrificial retention structure 22 with one of a plurality of connectors 24, configured to interconnect the cover assembly 16 and the display assembly 14, for allowing assembly, disassembly and reassembly of the housing 12, as needed, in accordance with principles of the present invention.

FIG. 6 is an enlarged partial cut away view of an assembled mobile electronic device 10. It shows the cover assembly 16 including an inwardly facing ledge 38 configured to receive a gasket 20 (shown compressed when assembled), the ledge 38 is generally L-shaped (rotated ninety degrees) and extends around a periphery 36 of the cover assembly 16, forming a channel 44. Also partially shown is a sacrificial retention structure 22 with one of a plurality of connectors 24, configured to interconnect the cover assembly 16 and the display assembly 14, for allowing assembly, disassembly and reassembly of the housing 12, as needed. As should be understood, the sacrificial retention structure 22 can be connected to the display assembly 14 in one embodiment, and preferably is connectable to the cover assembly 16, for ease of connection and ease of rework.

Figure 7:
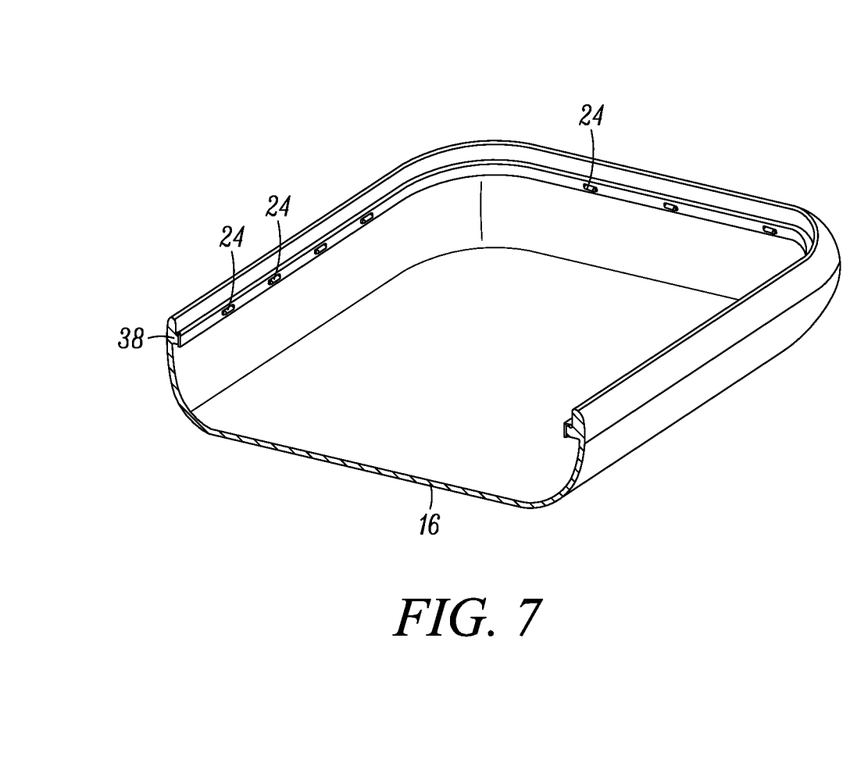
FIGS. 7 and 8 are an enlarged partial perspective, cut away views of an assembled mobile electronic device 10 shown in FIGS. 1-6, showing the cover assembly 16 including the ledge 38 configured with a gasket 20 extending around a periphery 36 of the cover assembly 16, forming a channel 44, the sacrificial retention structure 22 (in phantom) with a plurality of connectors 24, interconnect to the display assembly 14 through vias 46, for allowing a snap connection 48 between the connectors 24 and vias 46, in accordance with principles of the present invention.
Figure 8:
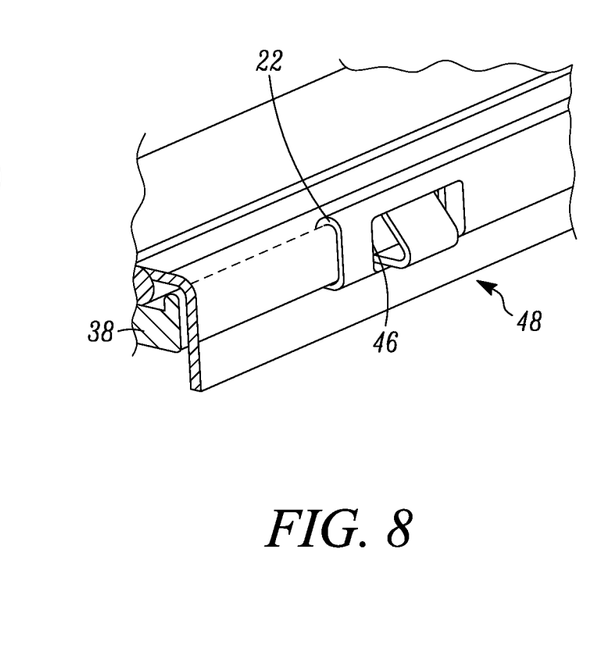

FIGS. 7 and 8 are an enlarged partial perspective, cut away views of an assembled mobile electronic device 10, showing the cover assembly 16 including the ledge 38 configured with a gasket 20 extending around a periphery 36 of the cover assembly 16, forming a channel 44, the sacrificial retention structure 22 (in phantom) with a plurality of connectors 24, interconnect to the display assembly 14 through receptacles/vias 46, for allowing a snap connection 48 between the connectors 24 and receptacle/vias 46.

In a preferred arrangement, the plurality of connectors 24 are snap-connected 48 with a via 46 on the lens frame 30 of the display assembly 14. As seen in the figures, the snap-connection 48 are formed and carefully, strategically spaced around the periphery 36, to provide a secure housing 12, which can be easily assembled and disassembled, if needed. This structure also helps to enhance water and dust resistance. In more detail, the plurality of connectors 24 include a male portion 25 extending inwardly and complementarily configured to interconnect with and be received in a female portion or via 46 in the lens frame 30 of the display assembly 14.

Figure 9:
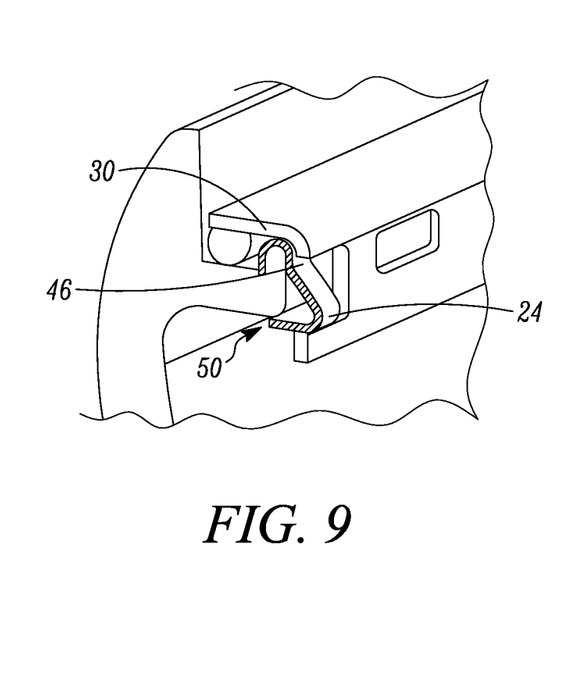
FIGS. 9 and 10 an enlarged partial perspective, cut away views of an assembled mobile electronic device 10 shown in FIGS. 1-6, showing the cover assembly 16 including the ledge 38 configured with a gasket 20 extending around a periphery 36 of the cover assembly 16, forming a channel 44, the sacrificial retention structure 22 being elongated and generally C-shaped 50 to connect to the distal portion 42 of the ledge 38. The plurality of connectors 24 are interconnected to the display assembly 14 through vias 46, for allowing the snap connection 48 between the connectors 24 and vias 46, in accordance with principles of the present invention.
Figure 10:
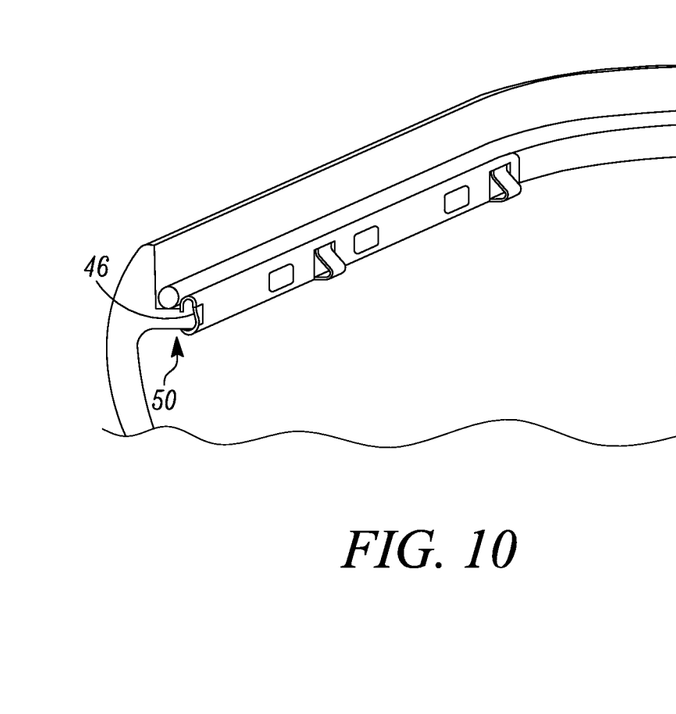
Figure 11:
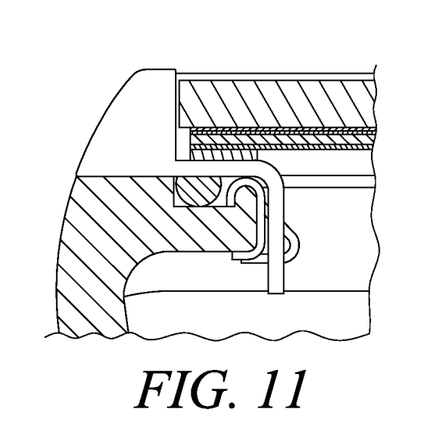
FIGS. 11, 12, 13 and 14 are enlarged partial cut away views of an assembled mobile electronic device 10 shown in FIG. 6, showing a decorative trim lens bracket 52, extended gasket 54, 3D contoured lens 56 and extended lens 58 designs, respectively.
Figure 12:
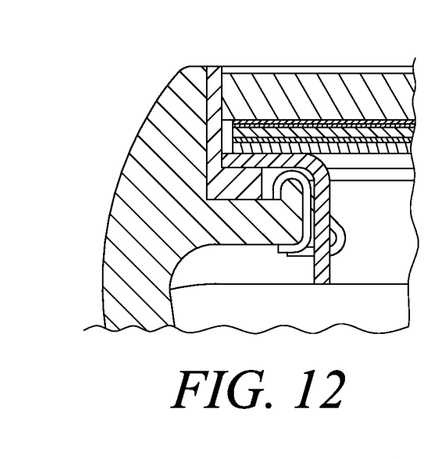
Figure 13:
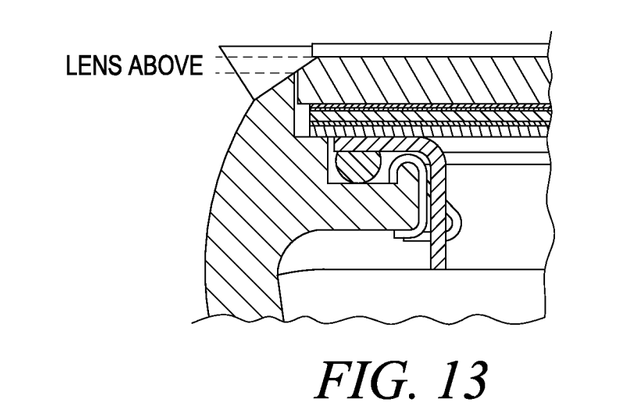
Figure 14:
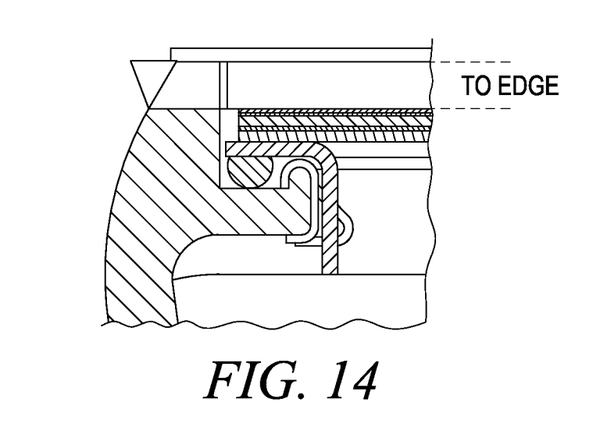

FIGS. 9 and 10 an enlarged partial perspective, cut away views of an assembled mobile electronic device 10, showing the cover assembly 16 including the ledge 38 configured with a gasket 20 extending around a periphery 36 of the cover assembly 16, forming a channel 44, the sacrificial retention structure 22 being elongated and generally C-shaped 50 to connect to the distal portion 42 of the ledge 38. The plurality of connectors 24 are interconnected to the display assembly 14 through vias 46, for allowing a snap connection 48 between the connectors 24 and vias 46.

In a preferred embodiment, a portion of the sacrificial retention structure 22 is complementarily configured to interconnect with an inwardly facing ledge 38 of the cover assembly 16. For example, the C-shaped 50 portion is complementarily configured and connected to the distal portion 42 of the ledge 38, for a secure connection. FIGS. 11, 12, 13 and 14 are enlarged partial cut away views of an assembled mobile electronic device 10 shown in FIG. 6, showing a decorative trim lens bracket 52, extended gasket 54, 3D contoured lens 56 and extended lens 58 designs, respectively. These designs allow various aesthetic and design options for a user.

Figure 15:
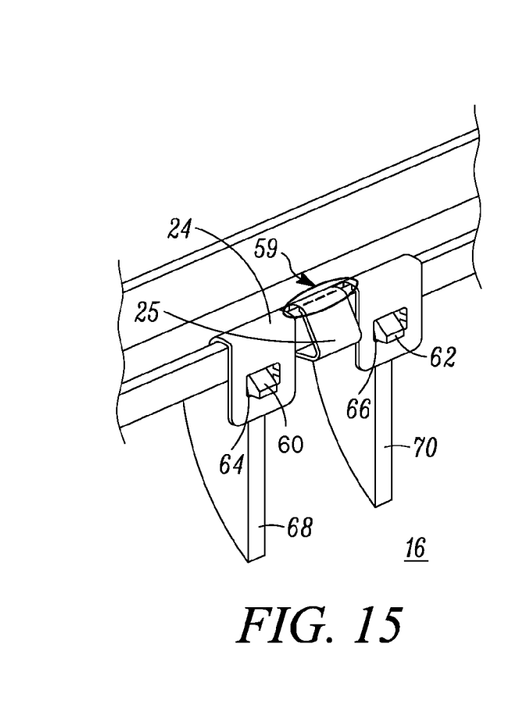
FIGS. 15, 16 and 17 are enlarged partial perspective views of an assembled mobile electronic device 10 shown in FIG. 1, showing connector 24 with a break area 59, secondary connectors 60 and 62 are snap connected to openings 64 and 66 of ribs 68 and 70, respectively, in accordance with principles of the present invention.
Figure 16:
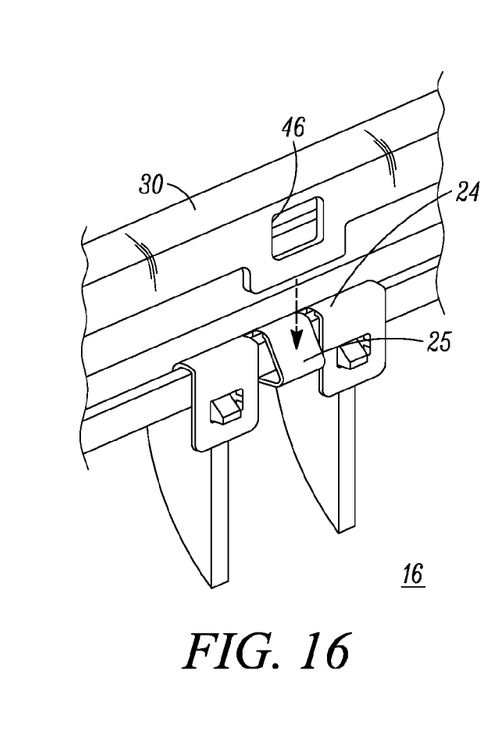
Figure 17:
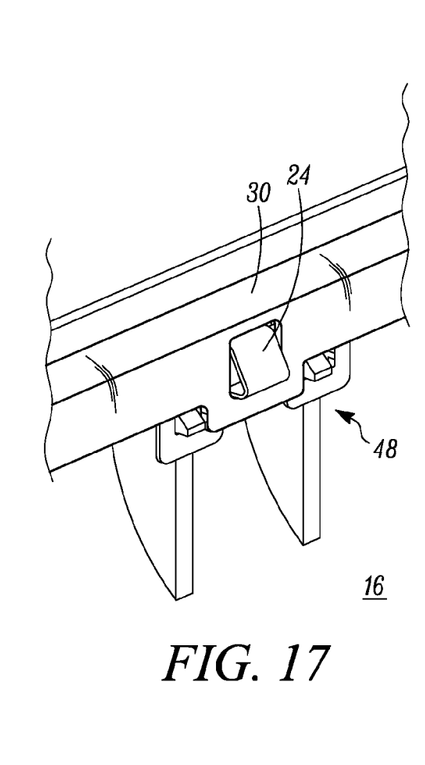

FIGS. 15, 16 and 17 are enlarged partial perspective views of one of the plurality of connectors 24 with a break area 59. Also shown are secondary connectors 60 and 62 of ribs 68 and 70 are snap connected or mated to openings 64 and 66 of connector 24, respectively. This structure provides ease of connection, assembly and disassembly of: (i) the frame 30 to the connector 24 and (ii) the connector 24 to the ribs 68 and 70 of the cover assembly 16. Beneficially, in the event, the device 10 needs rework, the housing 10 can be easily disassembled and reassembled with the use of a replacement sacrificial retention structure 22. The reworked housing 12 has enhanced water and dust resistance, in view of the overall construction and gasket 20.

This structure is strategically spaced throughout the periphery 36 of the housing 12 and provides a secure snap connection. In FIG. 16, the frame 30 and via 46 are aligned and lowered along line 72 for proper connection. FIG. 17 shows proper connection. In a preferred arrangement, the cover assembly 16 includes a plurality of ribs 68 and 70 configured to be snap-connected with openings 64 and 66. The ribs 68 and 70 provide additional structural integrity for the cover assembly 16. Additionally, a male portion 25 is configured to be received in the vias 46 of the sacrificial retention structure 22, for a secure connection of the sacrificial retention structure 22 with the cover assembly 16, at strategically place positions around the periphery 36 of the housing 12.

As should be understood, the housing 12 may be made of a host of materials, such as plastics and metals, for example.

Figure 18:
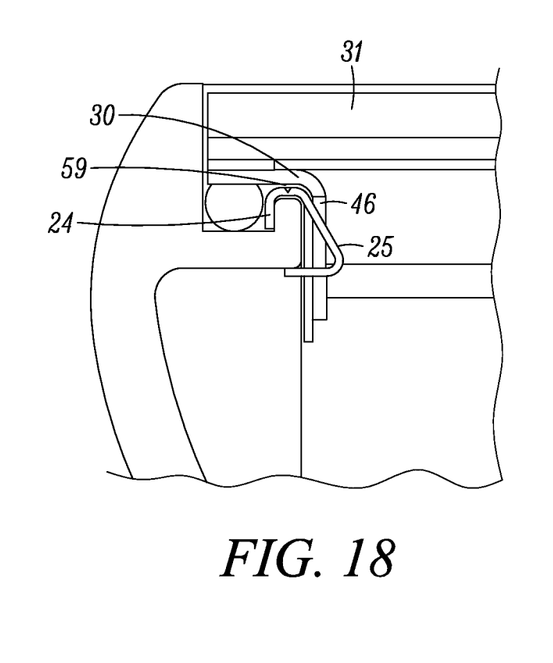
FIGS. 18 and 19 are enlarged partial cut away views of an assembled mobile electronic device 10 shown in FIG. 1, showing connector 24 with a break area 59 snap connected with via 46 in FIG. 18, and then pulled up along line 74 where connector 24 breaks along break area 59 upon disassembly, in accordance with principles of the present invention.
Figure 19:
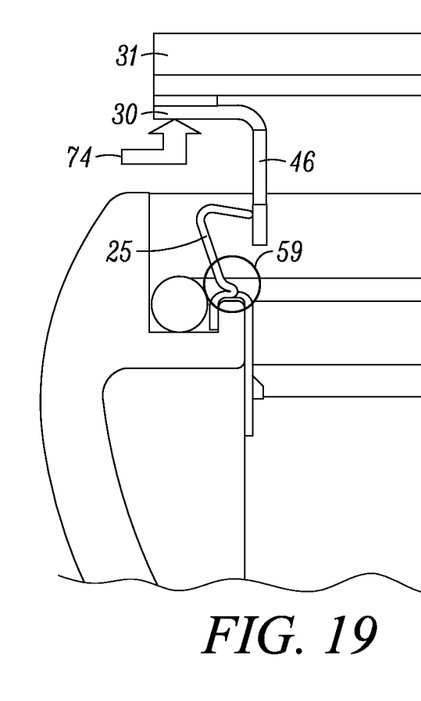

FIGS. 18 and 19 are enlarged partial cut away views of an assembled mobile electronic device 10 shown in FIG. 1, showing connector 24 with a break area 59 snap connected with via 46 or properly mated in FIG. 18, and then pulled up along line 74 where connector 24 breaks along break area 59 upon disassembly, shown in FIG. 19. In a preferred embodiment, the plurality of connectors 24 are configured with break away snaps which break upon disconnection of the display assembly 14 and the cover assembly 16, when rework or repair is necessary.

Advantageously, the break away snaps allow rework. For example, once trouble shooting is completed, the original sacrificial retention structure 22 is replaced with a new sacrificial retention structure 22. In a preferred embodiment, the plurality of connectors 24 are configured with break away snaps which break upon disconnection of the display assembly 14 and the cover assembly 16. Advantageously, break away snaps allow rework and repair, for example. Thereafter, once repaired, the original sacrificial retention structure is discarded and can be replaced with a new sacrificial retention structure 22.

Figure 20:
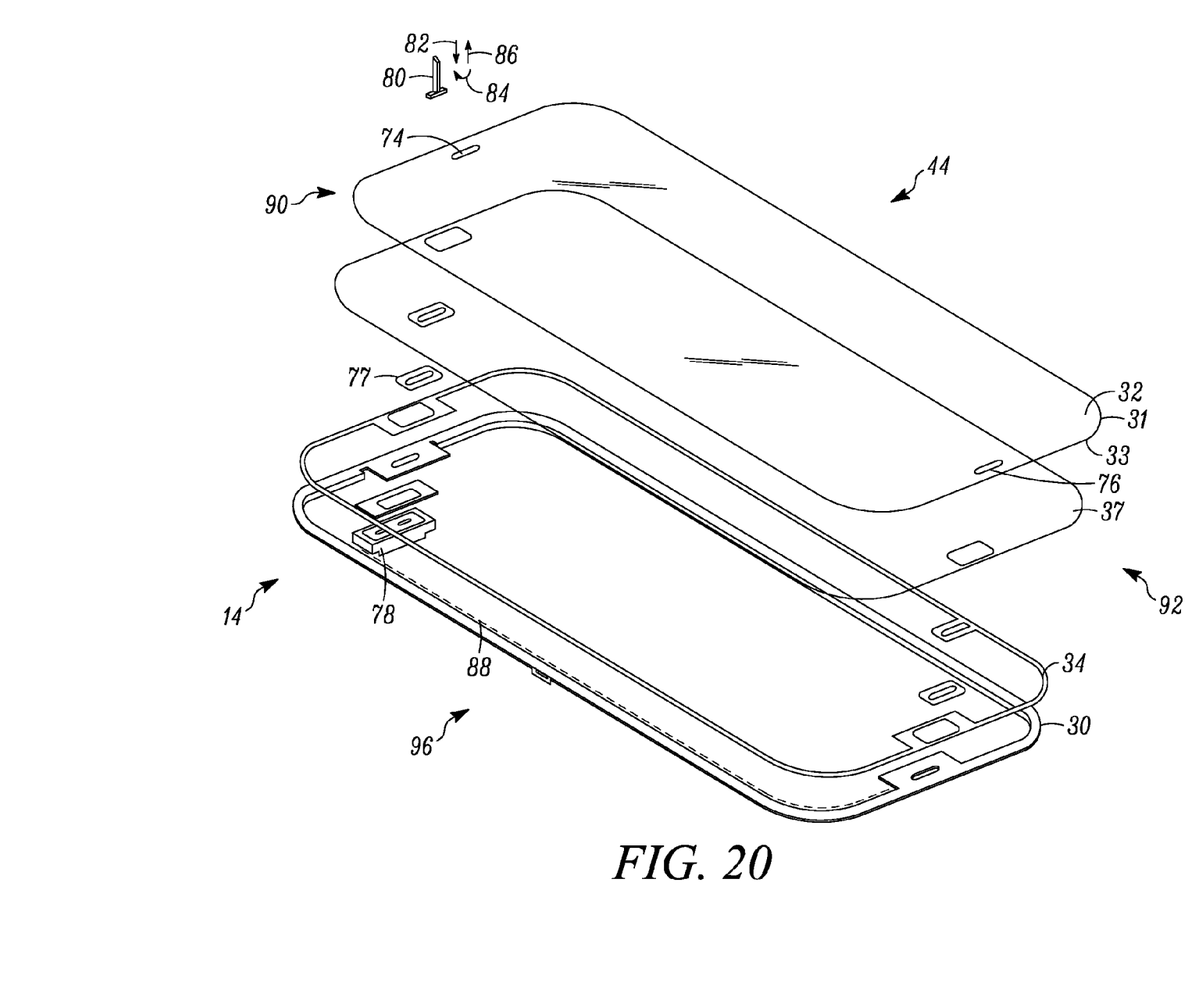
FIG. 20 is a partial isometric view of the mobile electronic device in FIG. 1, showing a display assembly 14, lens frame 30, lamination construction 34, touch sensor 37, lens 31 with vias 74 and 76 for an ear piece and a speaker. Also shown is a generally T-shaped rework tool 80, which can be inserted item 82 into a via 74, rotated item 84 about ninety degrees and pulled item 86, to peel and remove the display assembly 14 from the cover assembly in the event rework or repair is necessary, in accordance with principles of the present invention.

FIG. 20 is a partial isometric view of the mobile electronic device in FIG. 1, showing a display assembly 14, lens frame 30, lamination construction 34, touch sensor 37, lens 31 with vias 74 and 76 for an ear piece and a speaker. In a preferred embodiment, the speaker and microphone used herein are water resistant and are sealed to the display assembly 14 or display 28 to resist water entry into the enclosure 18. Advantageously, the frame and associated structure is modular and easy to assemble. Also shown is a generally T-shaped (shown upside down) rework tool 80, which can be inserted, item 82, into a via 74, for example, rotated, item 84, about ninety degrees and pulled, item 86, to peel and remove the display assembly 14 from the cover assembly 16 in the event rework or repair is necessary, without damaging the display assembly 14 and its associated structure. Advantageously, reworking allows a field worker or factory worker to repair the device 10, rather than having to scrap the device 10, for example.

In one arrangement, the display assembly 14 has an aperture. In a preferred arrangement, the display assembly 14 has a first ear speaker aperture 74 and a second microphone aperture 76, adapted for use as a phone. As shown in FIG. 20, this construction is particularly adapted for use in connection with a wireless communication device, such as a phone. The display assembly 14 can also include a lens stiffener 77 having an oblong aperture configured to receive the T-shaped removal tool 80, to minimize the chances of damaging the lens 31 and touch sensor 37 during removal.

In a preferred embodiment, the aperture 74 is oblong and is configured and adapted to receive a T-shaped removal tool 80. For example, the T-shaped tool is initially inserted into the oblong aperture 74 and rotated about ninety degrees, so that upon pulling 86 the tool 80, the display assembly 14 is removed or peeled away from the cover assembly 16. The male portion 25 is broken off at break point 59 as shown in FIG. 19, which allows removal. In the event of repair, a new sacrificial retention structure 22 is used and can reconnect the cover assembly 16 with the display assembly 14.

As shown in FIG. 20, in a preferred arrangement, the display assembly 14 includes a lens bracket 78 connected to a metallization pattern 88 which is connected to the lens frame 30, which can provide an antenna, such as a main antenna, antenna for use with GPS, diversity antenna, near field communication antenna, WLAN antenna and the like, in connection with a wireless communication device.

In yet more detail, the housing 12 includes a north section 90, a south section 92, an east section 94 and a west section 96 defining the periphery 36 of the housing 12 and display assembly 14 and cover assembly 16, shown in FIGS. 1 and 20. Each section has a multiplicity of connectors 24 substantially equally spaced around the periphery 36, for an enhanced sealing, connection and peelable disconnection from the north section 90 to the south section 92.

This structure provides a robust dovetail construction and interconnection.

In one embodiment, the mobile electronic device 10 can be a tablet, cell or portable phone and the like and would include electrical components such as a printed circuit board, an IC, a processor, transceiver, battery, a speaker, an antenna and microphone, substantially enclosed in enclosure 18. This provides an attractive and lightweight device with a touch screen, which is narrow in profile, repairable and having enhanced water and dust resistant.

Among the many advantages of the mobile electronic device are: superior capabilities, enhanced durability and performance, enhanced audio, navigation, scrolling, zooming and magnification, improved detection of finger gestures, reliability, comfortable, light weight, portable, user friendly, easy to use, economical, and attractive.

Although embodiments of the invention have been shown and described, it is to be understood that various modifications, substitutions, and rearrangements of parts, components, and/or process steps, as well as other uses of the mobile electronic device can be made by those skilled in the art without departing from the novel spirit and scope of this invention.

What is claimed is:

1. A mobile electronic device, comprising:
 a housing including a display assembly and a cover assembly, the display assembly being complementarily configured to be partially received in the cover assembly, to define an enclosure for electrical components;
a gasket located between the display assembly and the cover assembly; and
a sacrificial retention structure including a plurality of connectors configured to interconnect the cover assembly with the display assembly, wherein the cover assembly includes a plurality of ribs configured to be snap-connected with an opening portion on the sacrificial retention structure.

2. The mobile electronic device in accordance with claim 1 wherein the display assembly includes a touchscreen display.

3. The mobile electronic device in accordance with claim 1 wherein the mobile electronic device includes at least one of: a flip phone, slider phone, portable networking device, internet communications device, clamshell device, tablet device, radio telephone, cellular phone, mobile phone, smart phone, portable gaming device, personal digital assistant, wireless e-mail device, two-way pager, mobile computing device and handheld electronic device.

4. The mobile electronic device in accordance with claim 1 wherein the display assembly includes a lens and lens frame, adhesively laminated to each other.

5. The mobile electronic device in accordance with claim 1 wherein the cover assembly includes an inwardly facing ledge configured to receive the gasket.

6. The mobile electronic device in accordance with claim 1 wherein a portion of the sacrificial retention structure is complementarily configured to interconnect with an inwardly facing ledge of the cover assembly.

7. The mobile electronic device in accordance with claim 1 wherein the plurality of connectors are snap-connected with a receptacle on the display assembly.

8. The mobile electronic device in accordance with claim 1 wherein the plurality of connectors include a male portion extending inwardly to interconnect with a receptacle in the display assembly.

9. The mobile electronic device in accordance with claim 1 wherein the plurality of connectors are configured with break away snaps which break upon disconnection of the display assembly and the cover assembly.

10. The mobile electronic device in accordance with claim 1 wherein the display assembly has an aperture.

11. The mobile electronic device in accordance with claim 1 wherein the display assembly includes a lens stiffener having an oblong aperture configured to receive a removal tool.

12. The mobile electronic device in accordance with claim 1 wherein the display assembly includes a lens bracket.

13. The mobile electronic device in accordance with claim 1 wherein the display assembly includes a connector configured to connect a touch screen display to a printed circuit board in the housing.

14. A mobile electronic device, comprising:
a housing including a display assembly including a touchscreen display, a lens and lens frame, the lens and the lens frame adhesively laminated to each other and an inwardly facing ledge configured to receive a gasket and a cover assembly, the display assembly being complementarily configured to be partially received in the cover assembly, to define an enclosure for electrical components;
a gasket located between the display assembly and the cover assembly; and
a sacrificial retention structure including a plurality of connectors configured to interconnect the cover assembly with the display assembly, a portion of the sacrificial retention structure is complementarily configured to interconnect with the inwardly facing ledge of the cover assembly, wherein the plurality of connectors are snap-connected with opening portions on the display assembly, wherein the cover assembly includes a plurality of ribs configured to be snap-connected with an opening portion on the sacrificial retention structure.

15. The mobile electronic device in accordance with claim 14 wherein the display assembly has an aperture.

16. The mobile electronic device in accordance with claim 14 wherein the display assembly includes a lens stiffener having an oblong aperture configured to receive a T-shaped removal tool.

17. The mobile electronic device in accordance with claim 14, wherein the housing includes a north section, a south section, an east section and a west section including the plurality of connectors being located on each section.

18. The mobile electronic device in accordance with claim 14 wherein the cover assembly comprises a resilient material.

* * * * *